J. B. RUMSEY.
Cultivators.
No. 146,952.  Patented Jan. 27, 1874.
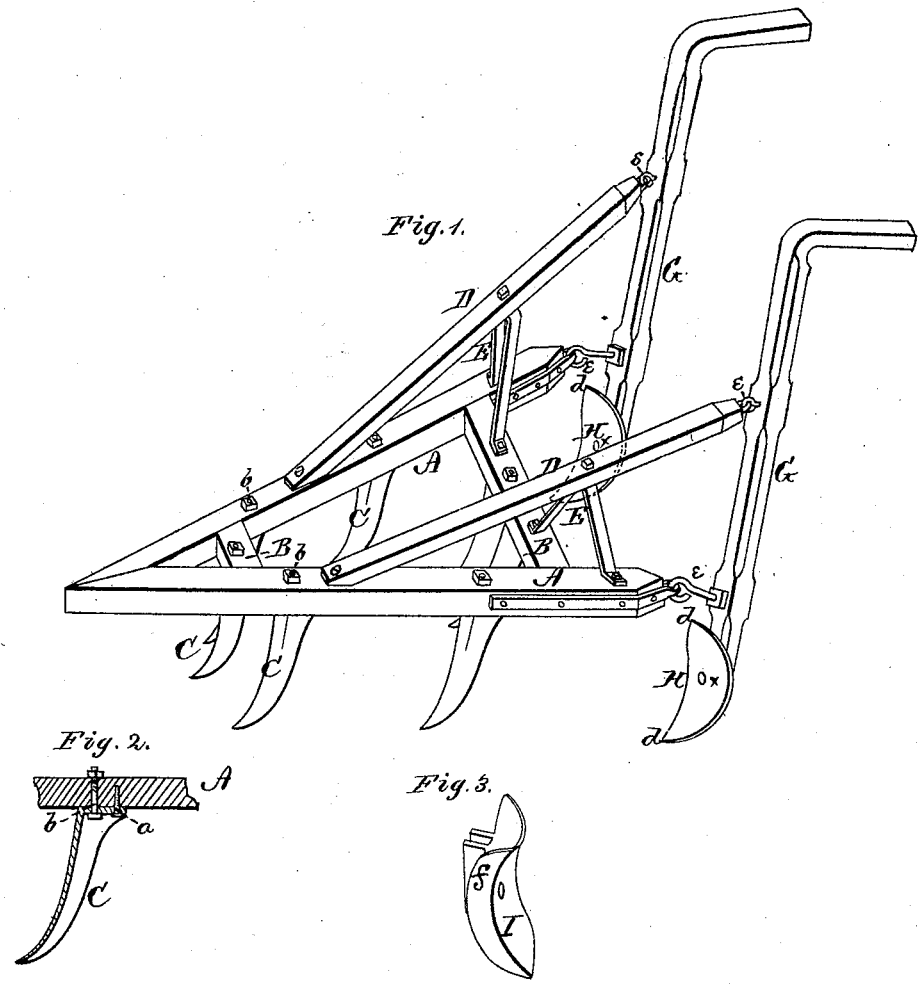
Witnesses.
C. L. Evert
James G. Rumsey
Inventor.
Jesse B. Rumsey

UNITED STATES PATENT OFFICE.

JESSE B. RUMSEY, OF WASHINGTON, DISTRICT OF COLUMBIA.

IMPROVEMENT IN CULTIVATORS.

Specification forming part of Letters Patent No. 146,952, dated January 27, 1874; application filed December 31, 1873.

*To all whom it may concern:*

Be it known that I, JESSE B. RUMSEY, of Washington, in the District of Columbia, have invented certain new and useful Improvements in Cultivators; and I do hereby declare the following to be a full, clear, and exact description thereof, reference being had to the accompanying drawings and to the letters of reference marked thereon.

The nature of my invention consists in hinging the handles to the frame of cultivator so that the operator will be enabled to swing them toward either side, and thereby carry the teeth or shovels attached to their lower ends either to the right or left of a straight line with the other teeth; in the construction of a reversible plow with angular side flange; and, also, in the general construction and arrangement of the cultivator and its teeth, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1 is a perspective view of my cultivator, and Fig. 2 is a longitudinal section of one of the teeth of the cultivator. Fig. 3 is a perspective view of a plow or shovel to be substituted, if desired, for the shovel (shown in Fig. 1) attached to the lower ends of the handles.

The frame of my cultivator is made in the form of a V, and consists of two beams, A A, connected or joined together at their front ends, and held at a suitable angle by means of cross-bars B B. C C represent the teeth of the cultivator, made substantially in the form shown in Fig. 2, and secured to the frame by a screw, *a*, and bolt *b*, the bolt having a nut upon its upper end. Upon the top of each beam A, a suitable distance from the front end, is fastened a bar, D, which extends upward and toward the rear, and is held firmly in place by means of a double brace, E. G G represent the handles, each of which is provided at its lower end with a shovel, H, made oval in form, and each end forming a point, *d*. This shovel is concave longitudinally and convex transversely, and is fastened to the handle by means of a single bolt, *x*, through the center, there being on the back of the shovel suitable flanges to fit on each side of the handle, and thus hold the shovel in position. When one end of this shovel is worn, it can easily be reversed, and answer the same purpose as a new one. The upper ends of the handles G G are bent at or nearly at right angles toward the rear. Each handle is hinged to the rear ends of the beam A and bar D by means of eyebolts *e e*, or any other suitable or convenient means, only so that it is capable of being turned to either side. This is of great importance in the proper cultivation of corn or other articles which are grown in rows.

By means of the hinged handles, the operator can with the greatest ease turn the shovels H H either to the right or left, so as to get closer to or farther from the row, or to bring more or less dirt to the row, as desired. By turning either handle, its shovel may be turned so as to cut weeds or tufts of grass which may be close by; also, obstructions are readily avoided.

Many other advantages of this construction might readily be mentioned, but they are apparent to every practical farmer.

In place of the shovels H H, I may in certain cases use the plow or shovel shown in Fig. 3. This plow I is also constructed with two points, so as to be reversible, and has a narrow flange, *f*, on the land-side. It is attached to the handle in the same manner as the shovel H, and can readily be changed from one handle to the other, as it is desired to throw the dirt to or from the row.

The narrow flange *f* is made angular, as shown, and the whole plow I is concave in form, with a point at each end, so that it can be reversed at pleasure.

Having thus fully described my invention, what I claim as new, and desire to secure by Letters Patent, is—

1. The combination of the cultivator-frame A B, bars D D, braces E E, and handles G G, hinged to the rear ends of the beams A, substantially as and for the purposes herein set forth.

2. The reversible concave plow or tooth I, provided with the angular narrow side flange $f$, substantially as shown and described, and for the purposes herein set forth.

3. The combination of the frame A B, teeth C, bars D D, braces E E, hinged handles G G, and the plows attached thereto, substantially as and for the purposes herein set forth.

In testimony that I claim the foregoing I have hereunto set my hand this 31st day of December, 1873.

JESSE B. RUMSEY.

Witnesses:
C. L. EVERT,
JAMES G. RUMSEY.